Figure 1:
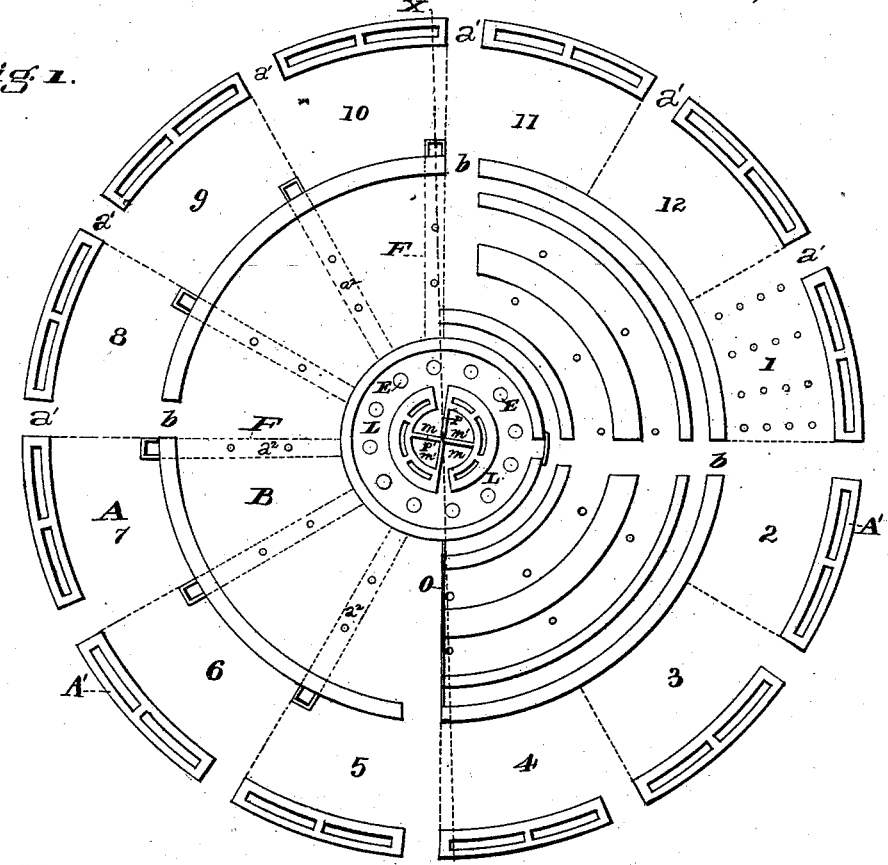

W. MANSFIELD.
Kilns and Sheds for Burning and Drying Bricks, &c.

No. 216,743. Patented June 24, 1879.

Attest:
Jno. W. Strehli.
W. S. Christopher.

Inventor:
Wm. Mansfield per
Wm. Hubbell Fisher,
Atty.

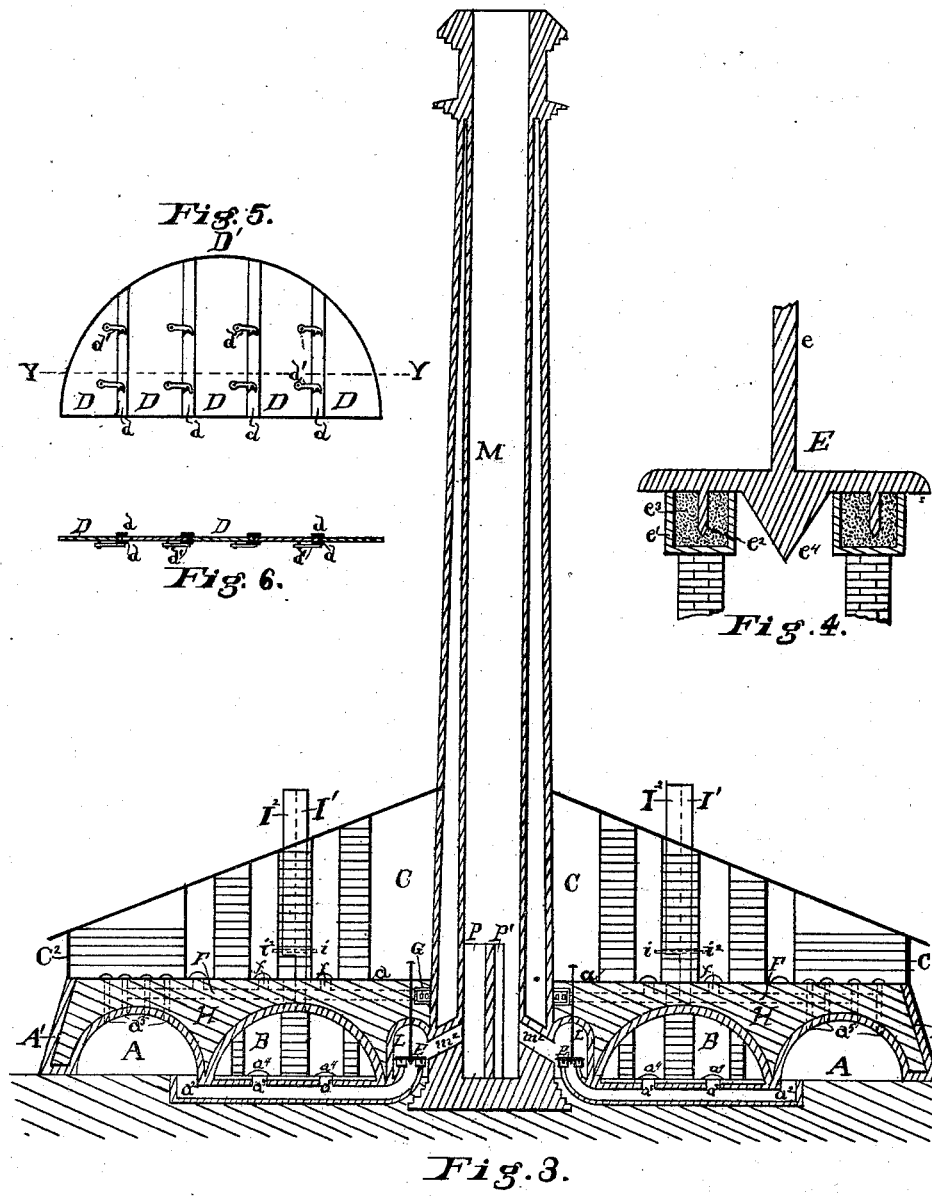

UNITED STATES PATENT OFFICE.

WILLIAM MANSFIELD, OF AVONDALE, OHIO.

IMPROVEMENT IN KILNS AND SHEDS FOR BURNING AND DRYING BRICK, &c.

Specification forming part of Letters Patent No. 216,743, dated June 24, 1879; application filed August 3, 1878.

*To all whom it may concern:*

Be it known that I, WILLIAM MANSFIELD, of the village of Avondale, county of Hamilton, and State of Ohio, have invented certain new and useful Improvements in Kilns and Sheds, of which the following is a specification.

My invention has for its main object the providence of means whereby bricks, tiles, pipes, and every description of clay goods, useful or ornamental, may be dried preparatory to being burned, by means of the waste heat derived from the fires employed in the burning of other goods, and whereby this end may be effected in a most convenient and economical manner.

A great loss of heat occurs in the ordinary modes of burning and drying bricks and other clay goods in common kilns and drying-sheds. This great loss arises in a twofold way: First, during the burning of the bricks, &c., the air which has passed through the fuel or among the heated bricks, and the smoke, including gaseous products generally, pass away from the kiln to waste at a very high temperature during a considerable part of the process; secondly, when the bricks or burning goods are raised to the high temperature required to burn them, and render them perfectly hard, the great store of heat which they contain is entirely left to dissipate while they are left to cool.

My invention effects a most remarkable saving of fuel and labor in a twofold manner, viz: First, it saves the heat of the gaseous products of combustion and unconsumed air passing through and away from the burning goods by applying this heat effectively in drying the new fresh bricks or other goods required to be well dried and about to be burnt. Thus when the fresh bricks are placed in the kiln, and the whole of the heat allowed to travel forward among them, it raises them up to an incandescent temperature, so that only a very slight addition of heat directly from the ignited fuel is required to complete their burning; and, secondly, it saves and utilizes all of the heat of the cooling goods after their having been sufficiently fired by applying it to the drying sheds or chambers, or in warming the air which goes forward to supply the fires, so that the fuel is burned with air already at a high temperature, instead of being required, as usual, to heat the air for its own combustion.

In every process of treating clay with a view to drying it in the open air or to burning it, these operations must be carried out gradually at risk of cracking and splitting the goods.

My invention, from its very gradual action and absence of sudden changes of temperature, produces no "wasters" from these causes, and the bricks can also be burned in a much more moist state than in ordinary kilns, as the heat is very gradually brought to bear upon them, though, of course, it is always best to set them when in as dry a state as possible.

My improvements consist, first, in a novel arrangement of the portions of the works employed for burning and drying the clay goods with reference to each other; secondly, in a novel arrangement of flues and dampers; thirdly, in a novel arrangement of shedding and shelves for drying purposes; fourthly, in a novel construction of the chimney in reference to the annular chambers which receive hot air, &c., and also in a novel construction of a damper employed in connection with the burning or drying compartment.

Figure 2:
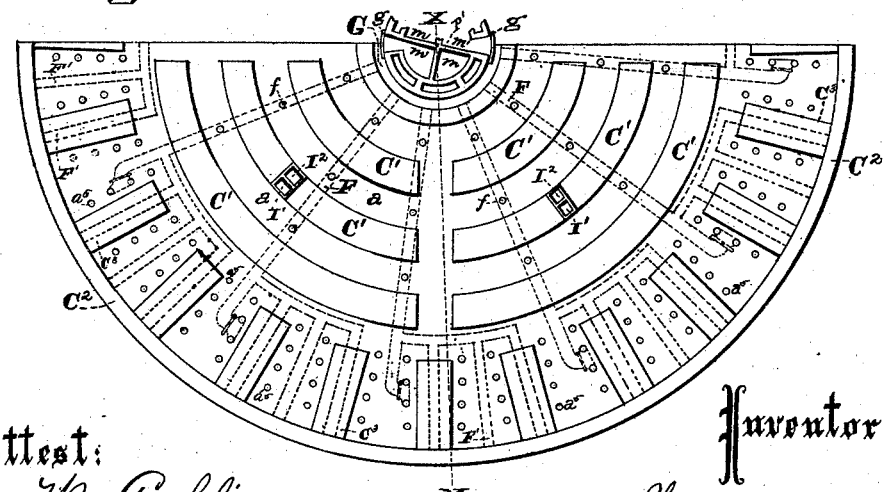

In the accompanying drawings, Figure 1, Sheet 1, represents a ground plan of a kiln embodying my invention. Fig. 2, Sheet 1, is a half-plan of the second floor of same. Fig. 3, Sheet 2, is a vertical sectional elevation through line $x\ x$ of Figs. 1 and 2. Fig. 4, Sheet 2, is an enlarged vertical central section of the cap. Fig. 5, Sheet 2, is an elevation of the portcullis; and Fig. 6, Sheet 2, shows a section through line $y\ y$ of Fig. 5.

The kiln-chamber A and inner drying-chamber, B, are each built in the form of large arched passages on the ground, bent either continuously or at intervals sufficiently to form a chamber of an annular description, within which the burning and drying of bricks or other clay goods is carried on. The arch of the burning-chamber and the arch of the drying-chamber are each of a regular shape. The inner face or surface of the arch is preferably free from every obstruction, so as not to in any way obstruct or impede the draft. Such absence of all and every obstruction is of the utmost importance to burn the goods uniformly throughout the chambers.

The preferred construction of the arches—viz., causing them to spring from the ground—is such as to enable them to be built up very cheaply, thereby throwing the thrust thereof so near the ground as to require little or no resistance of thrust. This construction of the arch enables me to dispense with the tie-rods, additional bracing, and brick-work, and also enables the brick-setter to reach and set the top bricks from the ground, thereby saving the pitching up of the bricks. This item effects an immense saving of both material and labor in construction and operation.

The drying-chamber is placed within the space inclosed by the kiln and contiguous to the latter. These chambers may be of any dimensions, depending on the quantity of goods required for daily delivery.

Above the chambers are drying-sheds C, for drying any class of goods ready for burning. As the floor $a$ of these sheds is about one story above the ground, they are supplied with an inclined approach or a hoistway as the means whereby the goods can be raised to the sheds or lowered from the latter again for setting and burning, thereby effecting a saving in labor over the old system of wheeling bricks from the drying-grounds to the sheds.

In the outside wall of the kiln are entrance-doorways $a^1$. In the kiln here shown there are twelve of these doorways. Between the kiln and inner drying-chamber, B, are doorways $b$, here four in number.

The burning-chamber may be divided into as many compartments as desired by means of dampers, preferably consisting of wrought-iron, made as shown in Fig. 5—viz., of sheets D, each provided with a lip or flange, $d$, which overlaps the adjacent sheet and forms a rabbet. Hooks $d'$ on the sheet catch over studs on the adjacent sheets and hold the same firmly in position. These dampers are removable, and may be placed across the annular chamber A when desired. The object of these dampers is to regulate the passage of hot air throughout the entire chamber.

The drying-chamber B can be left entirely open or closed, with transverse divisions or dampers into as many compartments as may be required, so as to regulate the passage of the hot air throughout the entire chamber.

In the space inclosed by the drying-chamber is erected a high chimney for the use of the entire kiln, drying-chambers, sheds, and works.

The burning-chamber may be considered as divided into as many compartments as there are spaces between the doorways $a^1$. From each of the twelve compartments of this annular chamber A an underground flue, $a^2$, leads into an annular receiving-chamber, L, which latter is connected with the chimney by flues $m^2$, and each flue is provided with a valve, E, by which its communication with the chimney can be cut off. This valve is to be shaped and operated in any desirable manner. Here (see Fig. 4) it is provided with a stem, $e$, reaching through up into the shed, and whereby it may be lifted from its seat $e^1$. The base of the valve is provided with an annular flange, $e^2$, projecting vertically downward.

The seat is provided with an annular recess, $e^3$, (filled with sand,) wider than the thickness of the flange $e^2$, and of such a diameter that when the center of the valve is placed over the center of the seat the flange will rest in the sand in the recess, as shown. The inverted cone $e^4$, fitted upon the under side of the valve, forms a guide to putting it in position from above.

Pressure upon the valve simultaneous with a turn or two of the same will suffice to bed the flange in the sand and render the valve air-tight. The flue $a^2$ is connected with the drying-chamber by vertical flues $a^3$, stopped by valves or dampers $a^4$.

The drying-shed C is provided with shelves, arranged as desired. Here they are placed in annular rows $C^1$, the rows being parted at intervals to admit of passage-ways between them. The shelves around the outer wall of the shed are preferably disposed in rows following the direction of radii from the center of the space encircled by the drying-chambers. These latter rows, $C^3$, of shelves are thus placed to allow the orifices $a^5$, connecting the burning-chamber and the drying-sheds, to be easily reached.

The drying-chamber B has also rows of shelving, preferably of a circular form, as shown in Fig. 1, divided at intervals to admit of passage for the introduction and removal of the goods.

It may be here remarked that the floor of the drying-sheds is composed of ground filled in upon the arches of the burning-chamber A and drying-chamber B, and retained in place at the outer edge by the brick-work $A^1$, and at the inner edge by the chimney.

The location of the flues not already described is as follows: A flue, F, connects with the orifices or flues $a^5$ $a^5$, preferably with the middle two, and extends to and is in communication with an annular flue, G, encircling the chimney. The latter is connected to the chimney by openings, (here two in number,) respectively closed by a valve or damper, $g$, whereby the amount of heat passing into the chimney may be regulated. Vertical flues $f$ connect this flue F with the drying-shed. Connected to each of these flues F are a series of heat-collecting flues, F', constructed of brick placed loosely together, which receive the heated air, &c., from the filling H when it is not allowed to pass off into the chimney or into the drying-shed C, and when the heat is not needed in their locality they draw it across to the other side of the shed by opening some of the dampers $f$ of flue F in the said opposite side. Where draft is not strong enough the dampers $g$ can be opened.

The roof of the annular drying-chamber is pierced at intervals with broad flues I. A portion of each flue opens into a vertical chimney, $I^1$, of wood or other preferred material, which, when not closed by a damper, $i$, conducts the heated air, &c., from the drying-chamber B to the outer air. The other part of the flue, closed by a damper, permits a communication being made between the drying-chamber and the drying-sheds, and also of a descent from the drying-sheds into the drying-chamber, and vice versa. Similar chimneys, $I^2$, conduct the surplus heated air, &c., from the drying-sheds to the outer air, the flow through each of the same being regulated by the damper $i^2$.

An opening, K, connects the drying-chamber B and the annular space L (or smoke-chamber) about the chimney to admit of ingress to the said space to inspect or repair the valves, &c..

The upper mouths of the orifices $a^3$, $a^5$, and $f$ are each closed with a valve or dampers, $2^x$. The preferable construction of the valve and its seat is of the construction shown in Fig. 4, except that the stem of the valve is omitted and a short handle substituted therefor.

These flues are made of any material suitable to withstand heat, preferably of brick.

The chimney M is provided with an annular cavity (with small studs between the walls to steady the latter) to allow for the expansion and contraction of the chimney, and thus prevent the cracking and destruction of the chimney. The interior of the lower portion of the chimney is divided by means of vertical cross-walls P P′ into four compartments—two, $m$ $m$, for the use of the lower smoke-chamber, and two, $m^1$ $m^1$, for the use of the upper steam or hot-air annular space or chamber. These cross-walls P P′ are carried up some distance above where the flues F enter the chimney. These compartments of the chimney allow the smoke-chamber L and the chamber G and their attendant flues to be operated independently of each other.

Mode of operation: The mode in which my improvements operate is as follows, viz: For example, bricks or other clay goods, being sufficiently dry, are set in compartment No. 1 of the burning-chamber A, in such shape as to radiate with the kiln, and with suitable openings over the spots $a^6$ left at intervals, as shown, for receiving the fuel when the bricks have become hot enough to ignite said fuel. A number of compartments—say, Nos. 2, 3, 4, and 5—are likewise set with bricks, &c., and the doorways are closed with loose brick and clay, and the opening from the burning-chamber into the drying-chamber will also be closed, and the farther end of compartment 5 is closed by the damper placed across the chamber at such point.

The outside doors are closed in any desired manner, preferably with wickets, consisting of loose brick built up and daubed with mud. In the same manner the doors between the burning and drying chambers may be closed. Fuel is then placed in openings in the end of the pile of bricks in compartment No. 1, and then, when the bricks become hot enough to ignite the fuel dropped in through the openings in the brick pile from the top, such fuel is dropped through the orifices $a^6$ over the compartment No. 1 into the openings, and the heat is allowed to travel through the compartments 2, 3, 4, and 5, heating, as it goes, the bricks from No. 1 (which is burning) to No. 5.

The arrangement of the small top feed-holes $a^6$ in straight radial lines, as shown, rather than in zigzag lines, or lines other than straight, and coincident or nearly coincident with the radii of a circle of which the chimney is the center, is very convenient, as the holes must be kept in such straight lines to allow the bricks and other goods to be placed in a regular manner, and also to allow of a perfect regular through-draft, so as to give a general uniformity of shape and color, which is very necessary, especially in burning the best description of bricks and other clay goods.

All steam generated from the heating bricks is taken off by means of flues F, thus preventing discoloration and the softening and disfigurement of the bricks.

When the fires are lighted in No. 1, the bricks are being set in compartments Nos. 6 and 7, and the next day the bricks in No. 2 are hot enough to be burned and fires are lighted therein, and at the same time the damper D′ is moved forward to the end of No. 7, and the doorways $a^1$, between Nos. 5 and 6 and 6 and 7, are closed, and doorway $b$, between 4 and 5, into the drying-chamber, being likewise closed. The damper E of flue F in No. 5 is closed, and that of No 7 is opened. I then cease firing from the end of No. 1, and continue firing each successive compartment by feeding in fuel, as aforesaid, from the top of the chamber over the compartment to be burned.

The next day I set the bricks in compartments 8 and 9, and then remove the damper D′ to the farther end of 9, stop up the wickets or doorways $a^1$, between 7 and 8 and 9, and the doorway $b$, between chambers 7 and 8, into the drying-chamber, and close flue F of chamber 7 and open that of chamber 9. By this time the bricks in No. 1 will have been burned and left to cool, and those in Nos. 2 and 3 will be burning, and 10 and 11 would be setting, and the dampers changed and doorways closed, as before. The next day No. 5 would be in readiness to burn, and fuel would be dropped therein, and the bricks in No. 1 would be in the act of being withdrawn. By the time No. 6 is ready to burn Nos. 3 and 4 would be burning, the bricks would be in the act of being withdrawn from No. 1, fresh brick being let in No. 12, and the brick in No. 2 cooling. Thus in six working-days we have the entire kiln at work. One half is either burned or burning, and the other is taking up waste heat and drying. The following working-day (Monday) the bricks of No. 2 are being drawn, No. 3 and 4 are cooling, No. 7 is burning, Nos. 8, 9, 10, 11, and 12 taking up waste heat, No. 1 is setting, so that each day afterward a chamber is set, another drawn, another burning, and the rest taking up waste heat, and the remainder cooling.

The heat I require for drying purposes I take from the bricks in the chambers that are cooling and being drawn, and distribute the same through the drying-chamber B and drying-shed C by means of flues $a^2$ $a^3$ F $f$ $a^5$.

One mode of collecting the heat for supplying the drying-sheds is as follows, viz: The cross-flues F' between the feed-holes $a^5$ collect the hot air which percolates through the filling, and this heated air is carried forward through the flues F to the steam space or chamber G, and from there distributed to any part of the sheds among the goods to be dried by means of the flue F adjacent to such part, by opening its vertical flue or flues $f$. Hot air can also be taken from the drying-chamber below and distributed through the sheds by allowing it to come up through the openings $I^2$. The flues $a^2$ also are used to take off as much hot air from the burning or cooling goods as may be required for drying purposes, the hot air being taken to the hot-air chamber or space L, and thence redistributed through any of the flues desired by opening the appropriate dampers E.

In heating the drying-chamber, the heat from the burning or cooling goods of the burning-chamber passing into the flues $a^2$ is allowed to pass out of the same into the drying-chamber by opening the dampers $a^3$, and is prevented from traveling farther than necessary by the use of the damper E.

Any compartment of the drying-chamber can be closed off from the rest by the portable dampers O. Thus I can keep one or more portions or compartments thereof cold, and be setting or withdrawing brick therefrom, and have the other compartments in use for drying, &c. The compartments of the burning-chamber or drying-sheds can each be cut off from each other when desired by means of dampers, as D'.

The purpose of the drying chamber and sheds is to prepare the clay goods for setting in the kiln before the drying and heating take place in the latter. After being dried in the drying chamber or sheds, the goods are sufficiently hard to be piled up in the kiln, and to sustain the weight of those placed upon them. This previous thorough drying also prevents discoloration of the goods. The sides of the sheds may be open or closed, according to the desire of the operator and the amount of the heat which is needed.

The same kind of kiln, with the same process of working, is applicable in the burning of all classes of clay goods, lime, &c., and for both the brick and clay goods and lime-burning, as also for the drying arrangements, the saving of fuel and labor relatively to what is consumed by the ordinary methods is such as to appear, at first sight, almost incredible.

Among other advantages which are obtained by the arrangements described in comparison with the old constructions are the following:

First, the atmospheric air necessary for supporting the combustion of the fuel absorbs the heat of the cooling goods and supplies the fire of the furnace with hot air, which results in a more favorable and most complete combustion, as well as economizing this heat, which is usually wasted. On the other side the superfluous heat from the burning and cooling chambers contributes to the gradual drying of the goods placed in the drying-chamber and upon the covered kiln in the drying sheds and heating of the goods to be burned, so that the whole of the heat is utilized and not a particle of it lost or wasted. The saving of fuel arrived at by this method amounts to the enormously large proportion of from two-thirds to three-fourths of that consumed in the old ordinary manner.

Second, the apertures through which the furnace receives the combustibles are so placed that at any time the state and progress of the fire of the kiln can be examined and regulated with the utmost accuracy. By this means a product of a very first-rate, or I may say superior, quality in all its parts can be produced, which could not be obtained in the common ordinary kilns.

Third, the charging and emptying of the kiln and drying-chambers can be done at the same time and without interruption, as each day a chamber can be filled, another emptied, and one burned, the remainder cooling and drying. The result is a saving of time, in consequence of which a large and regular supply of goods can be depended upon; and as the wickets are usually only four feet wide, (but can be made wide enough to admit carts, if necessary,) and require only that amount of casing in putting up, the saving of labor in casing alone is a grand item. An additional saving is effected in the item of fire-hole doors, &c., which have to be built up every time the ordinary kilns are burned, and which are not needed in my kiln.

Fourth, the height of the drying and burning chambers, being preferably only seven feet and six inches each, greatly facilitates the putting in and taking out of the articles to be dried or burned, as well as saving injury to the goods from supporting a great weight when at a very high temperature, and also effects a great saving of labor in not having a man to pitch them up to the setter, who usually, in the common kiln, stands upon the checkering to set the top goods in an open kiln.

Fifth, as all the compartments of the chambers are constantly being emptied in succession, any repairs can be made without interrupting the process; but these works, if properly constructed, are not liable to get out of order.

Sixth, as the combustibles are thrown into the compartments only when at a high heat, any sort of fuel, as wood, turf, small coal, &c., can be applied. In the use of coal the gas is immediately generated, and filling every part of the kiln burns the goods equally. In these kilns and drying-chambers there is a total absence of rapid draft, as the whole is under the perfect control of the burner or tender by the use of dampers attached thereto. The flame and heated products float gently onward, filling every part of the chamber, while in a state of perfect combustion.

Seventh, the furnace or kiln is well adapted for roasting ores, burning lime, cement, and firing pottery, as well as brick and other clay goods. The principle is also applicable to coke-ovens and annealing-ovens for malleable-iron castings, because the draft can be regulated, and the temperature increased or diminished, and the highest degrees of heat easily obtained and supported or diminished, as circumstances may require.

Eighth, besides saving such a large percentage in the quantity of fuel consumed, this kiln only requires to be supplied with small coal, slack or dust coal, of comparatively little value, and therefore further reduces the cost of manufacture.

Ninth, there is an absence of all smoke, arising from the perfect combustion of the fuel.

Tenth, freedom from injury to the drying and burning goods by any sudden change in the temperature, the heat being so gradually absorbed and given out again that no injurious action can arise from the operations being too rapidly performed.

Eleventh, the cost of labor in casing and burning, as well as feeding drying-furnaces, is so much reduced that the saving in this item alone is thirty per cent.

Twelfth, the drying of bricks and other clay goods by artificial heat in the old way is a very expensive process; but the manner by which the heat is taken from the burning and cooling goods in this kiln is very easy, and effects the whole saving of fuel used in drying thereby; and as all clay goods ought to be well dried before burning, so as to give them uniformity of shape and color, my present plan of this manufactory accomplishes the desired ends.

Either the drying-shed or the drying-chamber may be employed without the other in connection with the burning-chamber. The drying-chamber may be placed without the burning-chamber, or there may be a drying-chamber within and another without the burning-chamber, or the drying-chamber may inclose a burning-chamber, and be inclosed by another burning-chamber. The number of the drying-chambers and of the burning-chambers is not material.

While the chambers and sheds may not be continuous, and their system of connecting flues, &c., yet be very valuable, nevertheless an interruption of their continuous operation will prevent their best working, and deprive them of their best results.

I claim—

1. The flue F, provided with vertical flues $f$ and their dampers, in combination with the burning-chamber A and the drying-shed, substantially as and for the purpose set forth.

2. The flue F, provided with vertical flues and dampers, in combination with the burning-chamber A and drying-shed, and annular flue G and dampers $g$, and chimney, substantially as and for the purposes set forth.

3. The arrangement of the flues F, provided with vertical flues and dampers, in combination with the burning-chamber and drying-shed, and the annular chamber and dampers $g$, and chimney, substantially as and for the purpose set forth.

4. In combination with the flue F, the hot-air-collecting flues F', disposed above the top of the annular burning-chamber A, substantially as and for the purposes set forth.

5. The shedding C, provided with shelving, in combination with drying-chamber B and burning-chamber A, substantially as and for the purposes set forth.

6. The shedding C, provided with shelves arranged as particularly herein set forth, and consisting of the annular rows $C^1$ and the circumferential radial rows $C^2$, for the purposes set forth.

7. The shedding C, provided with shelves, arranged as particularly herein set forth, and consisting of the annular rows $C^1$ and the circumferential radial rows $C^3$, in combination with the radial rows of feed-holes $a^5$, substantially as and for the purposes set forth.

8. The drying-chamber B, provided with shelves arranged as particularly herein set forth, and consisting of the annular rows, for the purpose set forth.

9. In combination with the burning-chamber A and the drying-chamber B, the flues $a^2$, provided with vertical flues $a^3$, opening into the drying-chamber B, and dampers $a^4$, substantially as and for the purposes set forth.

10. The drying-chamber B, in combination with the burning-chamber A and the flues $a^2$, provided with vertical flues $a^3$, entering said drying-chamber B, and dampers $a^4$, annular chamber L, damper E, and chimney M, substantially as and for the purposes set forth.

11. The chimney M, in combination with the annular space G, dampers $g$, annular chamber L, openings $m^2$, and division-walls P P', 12. The flues F, conducting from the top of the burning-chamber A into the annular space G, in combination with dampers $2^x$, and the said space G, the dampers $g$, and chimney, as and for the purposes set forth.

13. The damper D', consisting of plates D, flanges $d$, hooks $d'$ and catches, substantially as and for the purposes set forth.

14. The combination of the annular burning-chamber A, dampers or portcullis D', inner drying-chamber, B, flues $a^2$ $a^3$, dampers $a^4$, annular space L, openings $m^2$, flues F, dampers $2^\times$, annular chamber G, dampers $g$, division-walls P P', and chimney M, drying-shed C, flues $I^2$, and dampers controlling the admission of heat from the drying-chamber into the drying-shed, substantially as and for the purposes set forth.

WILLIAM MANSFIELD.

Attest:
  WM. J. APPLEGATE,
  JNO. W. STREHLI.